United States Patent [19]
Sullivan, Jr.

[11] 3,742,580
[45] July 3, 1973

[54] BICYCLE GEAR SHIFT REPAIR

[76] Inventor: Daniel Andrew Sullivan, Jr., c/o Alcoa Development Community, R.D. No. 2, Rt. 780, New Kensington, Pa. 15068

[22] Filed: Apr. 26, 1972

[21] Appl. No.: 247,660

[52] U.S. Cl. .................................. 29/401, 74/489
[51] Int. Cl. ............................................. B23p 7/00
[58] Field of Search ................ 29/401; 74/578, 488, 74/489

[56] References Cited
UNITED STATES PATENTS
2,770,980  11/1956  Millward ............................ 74/489
3,154,176  10/1964  Smith .............................. 29/401 X
3,481,217  12/1969  Maeda ................................ 74/489

Primary Examiner—Charles W. Lanham
Assistant Examiner—D. C. Reiley, III

[57] ABSTRACT

A bicycle gear shifting device including a ratchet plate, a pawl, and a spring biasing the pawl for engaging teeth on the plate, no longer functions properly because the spring is unable to exert an adequate bias force; this condition is repaired by connecting a supplemental spring to the device for biasing the pawl into engagement with the ratchet teeth, without replacing the original spring.

3 Claims, 2 Drawing Figures

PATENTED JUL 3 1973　　　　　　　　　　　　3,742,580

BICYCLE GEAR SHIFT REPAIR

BACKGROUND OF THE INVENTION

The present invention relates to bicycle gear shifting devices usually mounted on bicycle handle bars and including a ratchet plate, a pawl, and a spring for biasing the pawl into engagement with ones of the teeth.

Such gear shifting devices are generally sold rivetted together, so that it is impossible to replace the spring once it has failed to exert its biasing function adequately. Spring failure can arise due to, for example, fatigue, creep, yielding, and corrosion. When a spring has failed in such devices, it has been the prior practice to remove the device with the faulty spring from the bicycle handle bar and replace the old device with a new one.

SUMMARY OF THE INVENTION

An object of the present invention, therefore, is to provide a simple method of repairing a gear shifting device of the above described type having a faulty spring, which method includes the advantages that no effort is expended to remove the faulty spring and the device need not even be removed from a handle bar on which it is mounted.

This, as well as other objects which will become apparent in the discussion that follows, are achieved according to the present invention by connecting a supplemental spring to the above described device for biasing the pawl into engagement with the ratchet teeth, without replacing the original spring.

DESCRIPTION OF THE PREFERRED EMBODIMENTS

Figure 1:
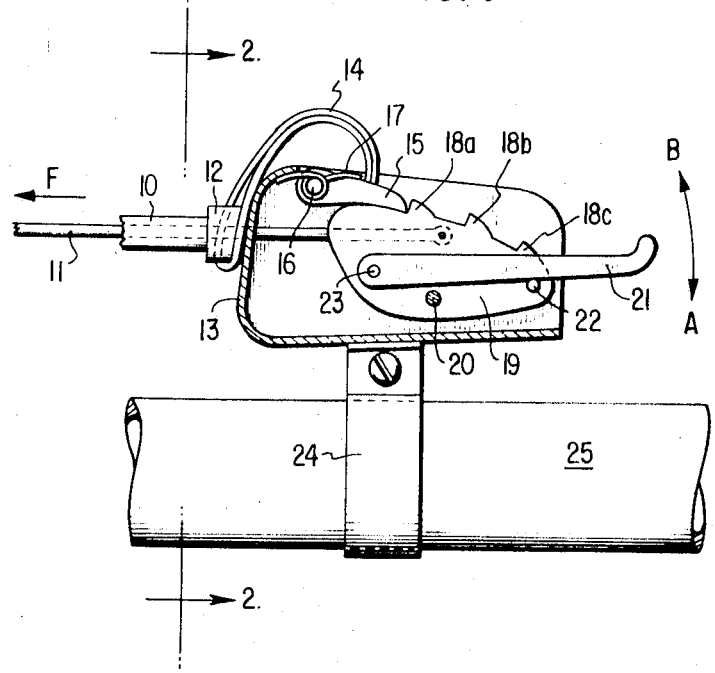
FIG. 1 is a plan view of bicycle gear shifting device, with a face plate removed, illustrating the method of the invention.
Figure 2:
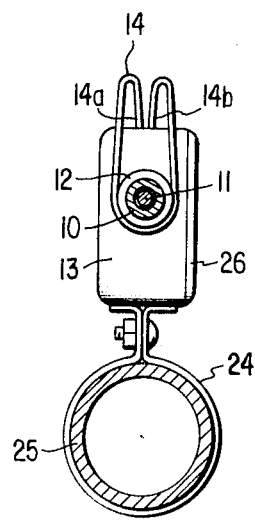
FIG. 2 is a partially sectional view on the cutting plane 2.—2. of FIG. 1.

Referring to FIGS. 1 and 2, a gear shifting device of the type intended for the method of the invention is shown attached to a handle bar 25 of a bicycle by a clamp 24.

The housing of the gear shifting device includes perimetral wall 13 and two opposing plates, one of which is exposed in FIG. 1, the other being plate 26 appearing in FIG. 2. Plate 26 does not appear in FIG. 1, it having been removed for the purpose of exposing the internal structure of the gear shifting device. Plate 26 is usually permanently secured in place to permanently close the housing, either by rivetting to the opposing plate or by welding to the perimetral wall 13. Perimetral wall 13 extends only through about 180° of arc, in order that lever 21 be free to perform its functions.

Ratchet plate 19 is pivotally mounted about pin 20, which is secured between the two opposing plates. Plate 19 may be rotated about pin 20 by manual pulling on lever 21 in the direction of arrow A. Lever 21 is pivotally connected to plate 19 at pin 23 and its pivoting in the direction of arrow A is stopped by lug 22 securred on the surface of plate 19. Thus, when lever 21 comes in contact with lug 22 when being pulled in the direction of arrow A, then plate 19 rotates about pin 20, with lever 21.

Plate 19 is generally biased for rotation in the direction of arrow B by the force F exerted by flexible cable 11, which is secured as shown to the plate. Flexible cable 11 extends through tube 10 to the rear axle (not shown) of the bicycle.

A rigid turret 12 is secured to the perimetral wall 13 at the hole through which cable 11 passes.

Pawl 15 is mounted pivotably to pin 16 and engages with one of ratchet teeth 18a, 18b, and 18c for locking plate 19 into various positions. Moving of plate 19 for engaging one of teeth 18a to 18c with pawl 15 pulls cable 11 correspondingly, thereby selecting the position of cable 11 and thus the particular gear that the bicycle is in. Pawl 15, in a new and properly functioning gear shifting device, is biased into engagement with the teeth by spring 17. The left side of spring 17 in FIG. 1 is welded to wall 13. The pawl can be released from the teeth by moving lever 21 in the direction of arrow B, so that the lever comes into engagement with the pawl and forces the pawl free of the particular tooth engaged at the time.

During use, the part of the gear shifting device that usually fails is spring 17, it no longer performing the function of biasing the pawl into secure engagement with the ratchet teeth of plate 19. With the housing permanently closed, it is not possible to replace the spring and it thus has been necessary to go to the expense of replacing the entire gear shifting device.

Spring failure can occur in a number of ways. Metal creep or corrosion can, for instance, lead to a reduction of the spring constant $k = f/x$, where $f$ equals force and $x$ equals displacement. Thus, while spring 17 is shown still bearing against pawl 15 in FIG. 1, the bias force may nevertheless no longer be sufficient to keep the pawl engaged with tooth 18a, due, for instance, to the presence of force F and/or to forces arising from bumps in the street pavement. There can also be a permanent plastic deformation of the spring, so that the spring is no longer able to remain in contact with pawl 15 when the pawl is in the position shown in FIG. 1. In FIG. 1, there may be, for instance, a gap, about equal to the thickness of the spring wire, between the spring and the pawl in the position shown; the gap may even be so large that no pawl-spring contact is present even when the pawl has rotated in the direction of arrow B such that its tip has passed-by the tip of tooth 18a.

According to the method of the present invention, a gear shifting device of the above-described type is repaired by connecting a supplemental spring 14 to the device for biasing pawl 15 into engagement with the ratchet teeth, without replacing spring 17 and even without removing the gear shifting device from the bicycle.

In the preferred embodiment shown, supplemental spring 14 is a piece of hay baling wire of around 0.05 inches diameter bent approximately into the configuration shown. The bending tends to cold work the wire and to increase its yield strength, thus increasing its effectiveness as a spring. The supplemental spring has a generally U-shape in FIG. 2, with the inside of the base of the U lying in contact with turret 12. As shown, the supplemental spring also has a U-shape in FIG. 1, with the base of the U-shape there being the high point in the Figure, one leg being connected to turret 12, the other leg bearing against pawl 15. The bias force arises from the tendency of the leg bearing against the pawl to coil around toward the leg connected to turret 12.

It will be realized by those skilled in the art that I have chosen my preferred embodiment because I could easily reduce it to practice and be sure that it works. Naturally, the means for carrying out the method of the invention is capable of being presented in a more polished, salable embodiment by modern production methods.

I claim:

1. A method of repairing a gear shifting device comprising in assembly a ratchet means for pulling a flexible linkage into a plurality of selected positions, pawl means for engaging with ratchet teeth on said ratchet means for locking said ratchet means in any one of said selected positions, and spring means for biasing said pawl means into engagement with said ratchet teeth, which spring means no longer performs its function of biasing said pawl means into engagement with said ratchet teeth, which method comprises connecting a supplemental spring to said device for biasing said pawl means into engagement with said ratchet teeth, without replacing said spring means in said device.

2. A method as claimed in claim 1, said ratchet means and said pawl means including a common housing, said housing having a rigid turret securred thereto through which said flexible linkage extends, the connecting of the supplemental spring being between said turret and said pawl.

3. A method as claimed in claim 1, said gear shifting device further including a permanently closed housing about said spring means.

* * * * *